United States Patent [19]
Miyawaki et al.

[11] Patent Number: 5,539,196
[45] Date of Patent: Jul. 23, 1996

[54] PHOTO-ELECTRIC CONVERSION APPARATUS WITH GAIN CONTROLLABLE AMPLIFIERS

[75] Inventors: Mamoru Miyawaki, Isehara; Isamu Ueno, Hadano, both of Japan

[73] Assignee: Canon Kabushiki Kaisha, Tokyo, Japan

[21] Appl. No.: 412,102

[22] Filed: Mar. 28, 1995

Related U.S. Application Data

[63] Continuation of Ser. No. 248,170, May 24, 1994, abandoned.

[30] Foreign Application Priority Data

May 28, 1993 [JP] Japan ................................. 5-127086

[51] Int. Cl.[6] .................................................. H04N 5/335
[52] U.S. Cl. ......................... 250/208.1; 330/308; 348/300
[58] Field of Search .............................. 250/208.1, 208.2, 250/208.3, 201.2, 201.7, 201.9, 214 R, 214 A, 214 LA, 214 AG; 330/59, 308, 278; 307/311; 348/300, 301, 302, 304; 358/461

[56] References Cited

U.S. PATENT DOCUMENTS

| | | | |
|---|---|---|---|
| 4,649,267 | 3/1987 | Ray | 330/308 X |
| 4,691,241 | 9/1987 | Tomohisa et al. | 358/409 |
| 4,939,475 | 7/1990 | Prasse et al. | 330/308 X |
| 5,012,202 | 4/1991 | Taylor | 250/214 A |
| 5,015,839 | 3/1991 | Tanikoshi | 250/214 AG |
| 5,070,236 | 12/1991 | Miyake | 250/208.1 |
| 5,097,305 | 3/1992 | Mead et al. | 330/59 |
| 5,146,339 | 9/1992 | Shinohara et al. | 358/212 |
| 5,262,870 | 11/1993 | Nakamura et al. | 358/212 |
| 5,315,102 | 5/1994 | Abe et al. | 250/208.1 |
| 5,322,994 | 6/1994 | Uno | 250/214 A |
| 5,345,266 | 9/1994 | Denyer | 348/300 |
| 5,363,064 | 11/1994 | Mikamura | 250/214 AG |

FOREIGN PATENT DOCUMENTS

| | | |
|---|---|---|
| 0473966 | 3/1992 | European Pat. Off. . |
| 2185654 | 7/1987 | United Kingdom . |
| WO9104633 | 4/1991 | WIPO . |

*Primary Examiner*—Edward P. Westin
*Assistant Examiner*—John R. Lee
*Attorney, Agent, or Firm*—Fitzpatrick, Cella, Harper & Scinto

[57] ABSTRACT

A photo-electric conversion apparatus having a plurality of photo-electric conversion elements is provided with an amplifier which can externally control a gain thereof, at an output terminal of each of the photo-electric conversion elements.

29 Claims, 7 Drawing Sheets

PHOTO-ELECTRIC CONVERSION APPARATUS WITH GAIN CONTROLLABLE AMPLIFIERS

This application is a continuation of application Ser. No. 08/248,170 filed May 24, 1994, now abandoned.

BACKGROUND OF THE INVENTION

1. Field of the Invention

The present invention relates to a photo-electric conversion apparatus used in an AE sensor or AF sensor of a copying machine, a facsimile machine, a video camera recorder and a camera.

2. Related Background Art

As an electronics technology has highly developed recently, high image fineness and high image quality have rapidly been realized in a field of a solid state image pick-up device used as a photo-electric conversion apparatus. An output of the solid state image pick-up device is rarely used as it is but it is processed in several stages before it is formed into a TV signal.

Accordingly, when the number of pixels is increased to attain high fineness, a huge volume of operation and processing are required in the signal processing and the high image quality may be restricted by the signal processing.

SUMMARY OF THE INVENTION

It is an object of the present invention to provide a solid state image pick-up device which produces signals multiplied by coefficients in order to build a signal processing function in the solid state image pick-up device.

The above object of the present invention is achieved in the photo-electric conversion apparatus comprising a plurality of photo-electric conversion elements by providing an externally gain controllable amplifier at an output terminal of each photo-electric conversion element, so that signal processing for multiplying a desired coefficient to each signal is well attained.

Other objects of the present invention will be apparent from the following description of the invention and the accompanying drawings.

DETAILED DESCRIPTION OF THE PREFERRED EMBODIMENTS

Figure 1:
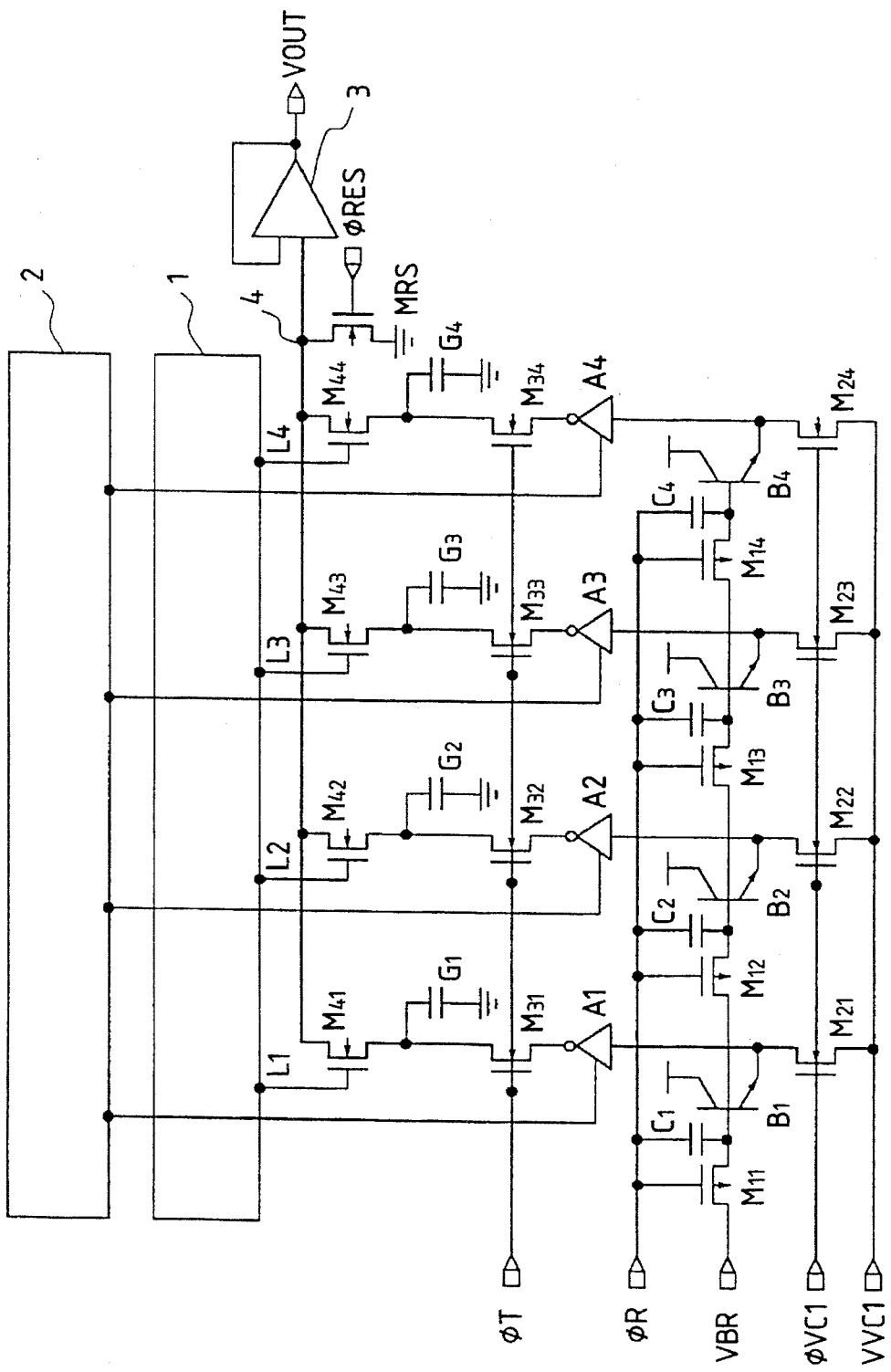
FIG. 1 shows a circuit configuration of a photo-electric conversion apparatus in accordance with an embodiment 1 of the present invention.

FIG. 1 shows a first embodiment of the present invention. In the present embodiment, bipolar photo-electric conversion elements are one-dimensionally arranged as photo-electric conversion elements, and base regions thereof are interconnected through PMOS transistors $M_{11}$–$_{14}$.

Amplifiers A1–A4 are independently connected to respective emitter output lines of the photo-electric elements.

Figure 2:
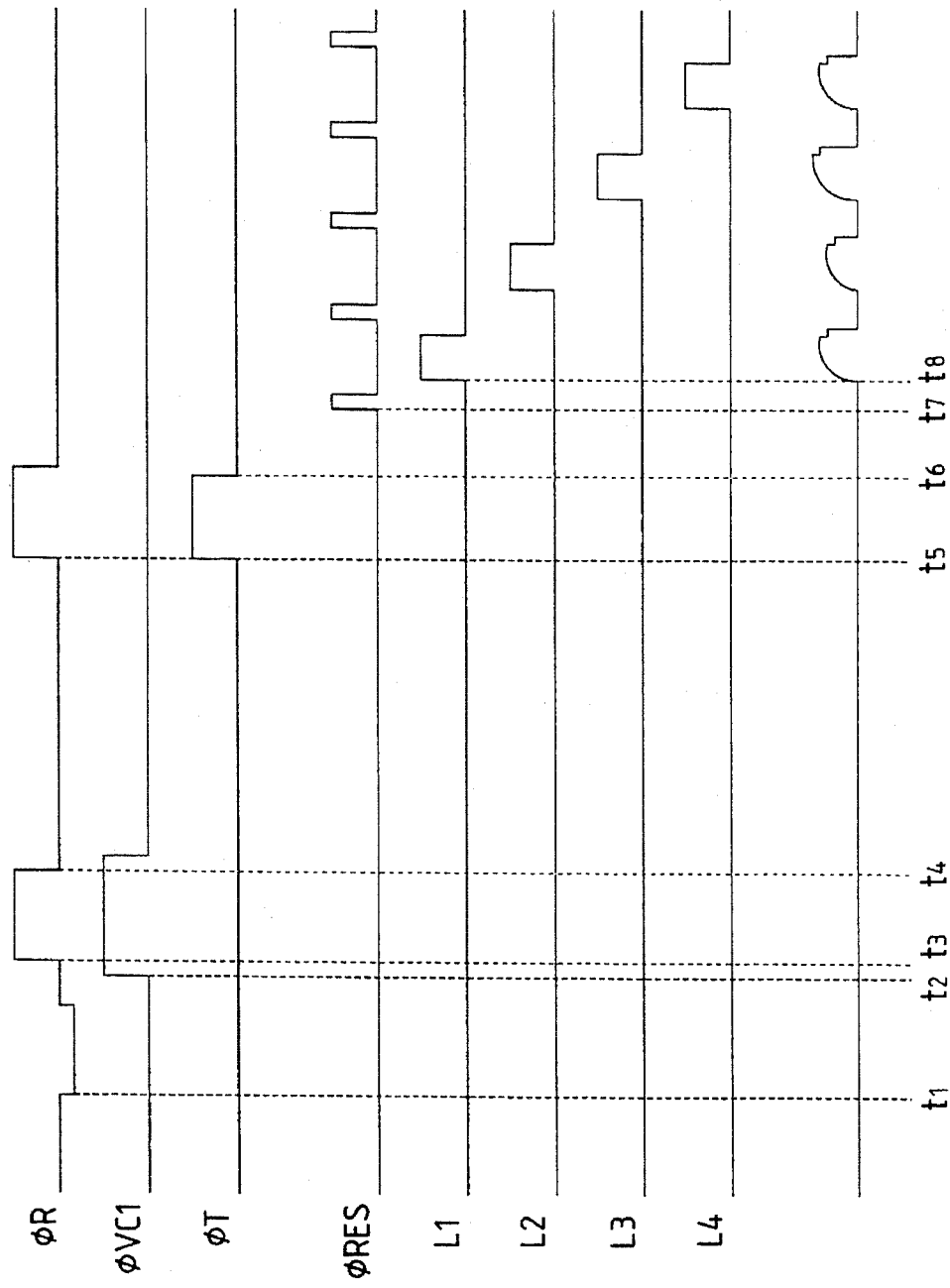
FIG. 2 shows a timing chart for illustrating an operation of the embodiment 1 of the photo-electric conversion apparatus.

An operation of the present embodiment is explained by referring to a timing chart of FIG. 2.

At a time $t_1$, a pulse of a low level is applied to $\phi_R$ so that the PMOS transistors $M_{11}$–$M_{14}$ are turned on and the bases of the bipolar transistors $B_1$–$B_4$ are connected in common and reset to $V_{BR}$. Thereafter, $\phi_R$ rises to a middle level so that the PMOS transistors $M_{11}$–$M_4$ are turned off and the reset operation is terminated.

At a time $t_2$, a pulse $\phi_{VC1}$ rises and the NMOS transistors $M_{21}$–$M_{24}$ are turned on so that emitter terminals of all bipolar transistors $B_1$–$B_4$ are reset to a voltage $V_{VC}$, and at a time $t_3$, a pulse $\phi_R$ rises to a high level so that the base potentials of the bipolar transistors $B_1$–$B_4$ are brought up through capacitors $C_1$–$C_4$ and the base-emitter junctions is forwardly biased. Thus, the bipolar transistors simultaneously operate in an emitter follower mode and hole on the bases are recombined and the base potentials are settled around $V_{VC}+V_{BE}$ (Transient reset operation). When the transient reset operation is terminated, at a time $t_4$, the pulse $\phi_R$ falls to the middle level so that the base potentials of the respective bipolar transistors fall through the capacitors $C_1$–$C_4$ and the base-emitter junction is reversely biased. From this state, an accumulation operation of the photo-carriers starts.

After a predetermined accumulation time has elapsed, at the time $t_5$, the pulses $\phi_T$ and $\phi_R$ rise to the high level so that the NMOS transistors $M_{31}$–$M_{34}$ are turned on and the base potentials of the bipolar transistors $B_1$–$B_4$ are brought up to forwardly bias the base-emitter junction. Thus, the photo-carriers accumulated on the bases are outputted from the emitter terminals. By applying predetermined voltages from a power supply 2 to the control terminals of the amplifiers $A_1$–$A_4$, the respective amplifiers may have desired gains.

The outputs of the amplifiers $A_1$–$A_4$ are read to $C_{T1}$–$C_{T4}$, respectively, and at a time $t_6$, the pulse $\phi_T$ falls to the low level so that the NMOS transistors $M_{31}$–$M_{34}$ are turned off and the voltages on the respective capacitors $C_{T1}$–$C_{T4}$ are maintained. At the time $t_6$, the pulses $\phi_T$ and $\phi_R$ rise to the high level simultaneously. However, it is preferable that the pulse $\phi_T$ raises to the high level earlier than the pulse $\phi_R$.

Thereafter, at a time $t_7$, a high level pulse is applied to $\phi_{RES}$ so that the NMOS transistor $M_{RS}$ is turned on, and after the output line 4 is reset, the scan circuit 1 is operated to transfer the signals to the output terminal $V_{OUT}$ through the output buffer 3 starting from the signal on $C_{T1}$.

Figure 3:
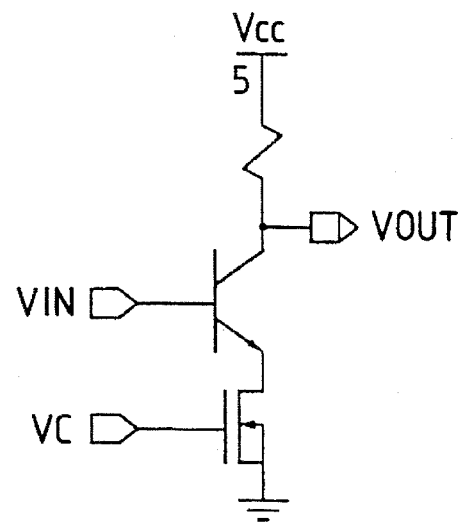
FIG. 3 shows a circuit diagram of an amplifier used in the present invention.
Figure 4:
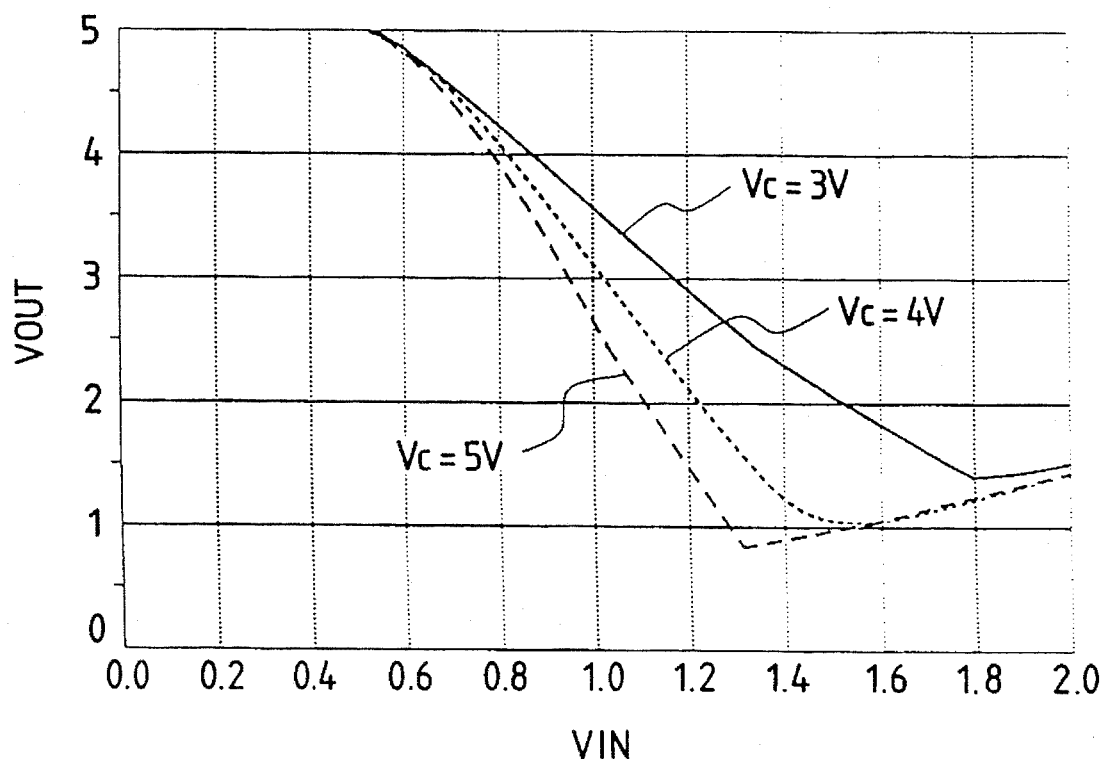
FIG. 4 shows a graph of a characteristic of the amplifier.

A preferred embodiment of the amplifiers A1–A4 and a DC characteristic thereof are shown in FIGS. 3 and 4.

FIG. 3 shows an inverting amplifier using an NPN transistor and a gain thereof is controlled by a gate voltage of an NMOS transistor connected to an emitter terminal.

Calculation of a DC characteristic of the inverting amplifier is shown in FIG. 4.

In FIG. 4, an abscissa represents an input voltage $V_{IN}$ and an ordinate represents an output voltage $V_{OUT}$, and a graph is shown with the gain control voltage $V_C$ being used as a parameter. As seen from FIG. 4, the larger the $V_C$ is, the larger is the gain. Thus, it is suitable for the present invention because of its smaller circuit scale. Needless to say, other type of amplifier may be used.

Figure 5:
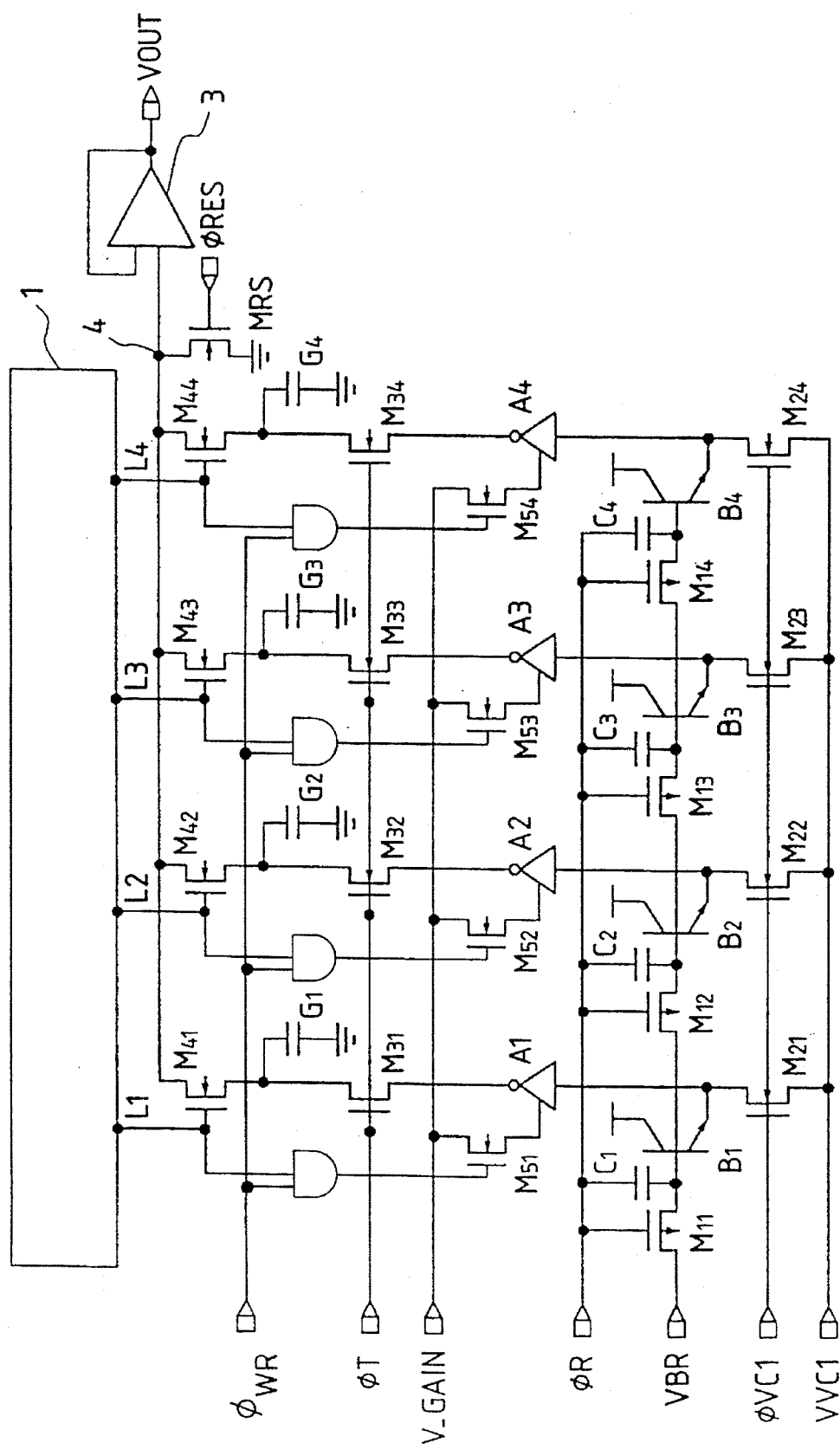
FIG. 5 shows a circuit configuration of a photo-electric conversion apparatus in accordance with an embodiment 2 of the present invention.

FIG. 5 shows a second embodiment of the present invention. The present embodiment is an improvement over the first embodiment in that the power supply 2 is omitted and the gain control voltages of the amplifiers A1–A4 are serially applied from a terminal V-GAIN.

In an operation, the scan circuit 1 is operated during the accumulation period and the pulse $\phi_{WR}$ rises to the high level, the NMOS transistor M51 is turned on so that the gain control voltage of the amplifier A1 is written from the terminal V-GAIN. Thereafter, the pulse L1 is rendered to the low level and M51 is turned off to hold the written voltage. This operation is sequentially carried out for the amplifiers A1–A4, and thereafter the pulse $\phi_R$ rendered to the high level so that the respective photo-electric conversion elements carry out the read operation and the voltages multiplied by the factors of the respective gains are read at $C_{T1}$–$C_{T4}$.

Other operations may be carried out in the same manner as those of FIG. 1.

Accordingly, the space is significantly saved compared to case where the power supply is provided for each amplifier.

In the above explanation of the operation, the control voltages of the amplifiers A1–A4 are written during the accumulation period although they may be written in other period, for example during the sequential transfer of the charges of $C_{T1}$–$C_{T4}$. In this case, the gain control voltages written in the amplifiers A1–A4 are used in the next photo-electric conversion operation.

Figure 6:
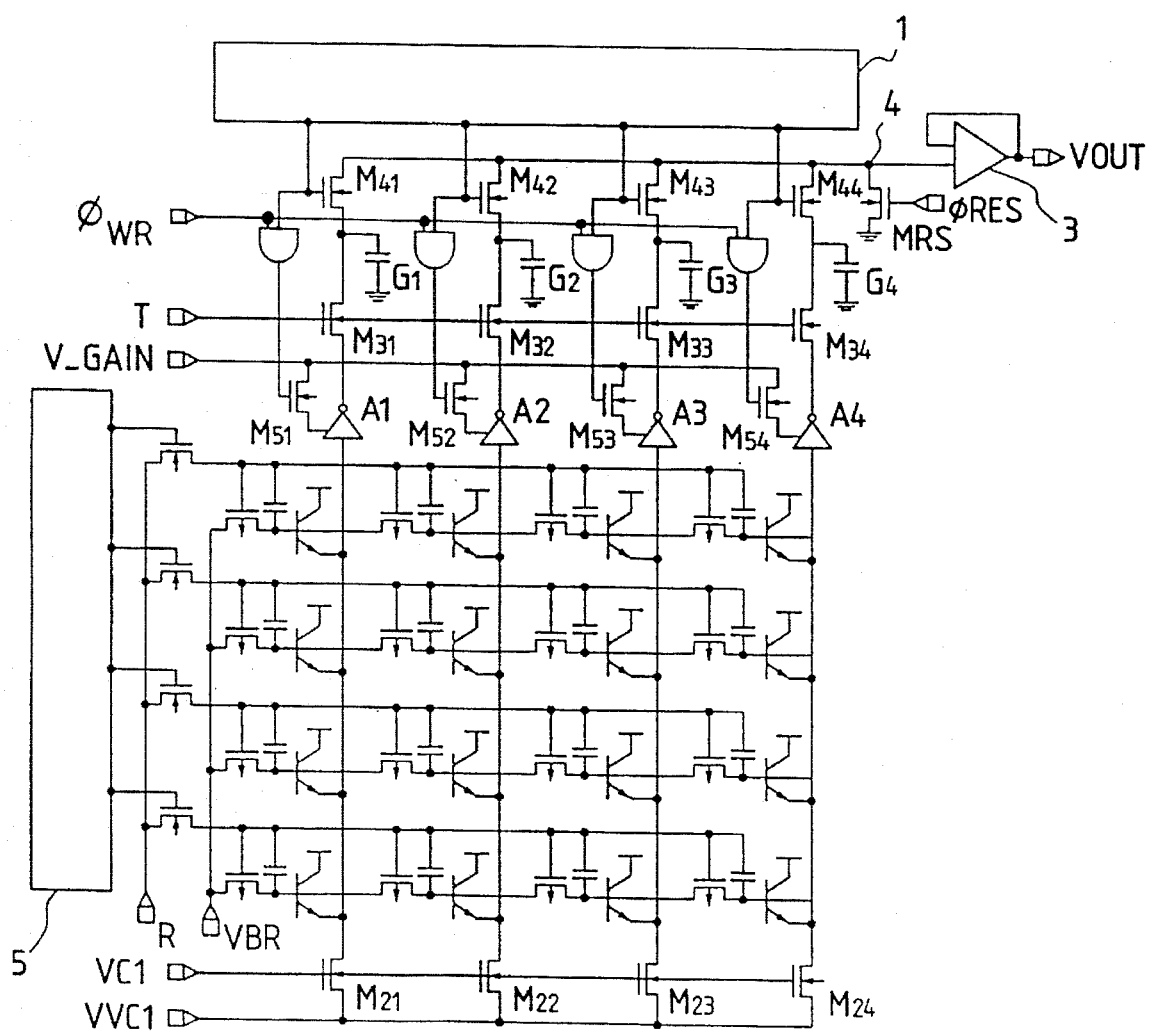
FIG. 6 shows a circuit configuration of a photo-electric conversion apparatus in accordance with an embodiment 3 of the present invention.

FIG. 6 shows a third embodiment of the present invention. In the present embodiment, the second embodiment is developed to a two-dimensional photo-electric conversion apparatus. A vertical scan circuit 5 is provided to conduct serial resetting and signal reading of the photo-electric conversion elements row by row. The basic operation is identical to that of the second embodiment.

Figure 7:
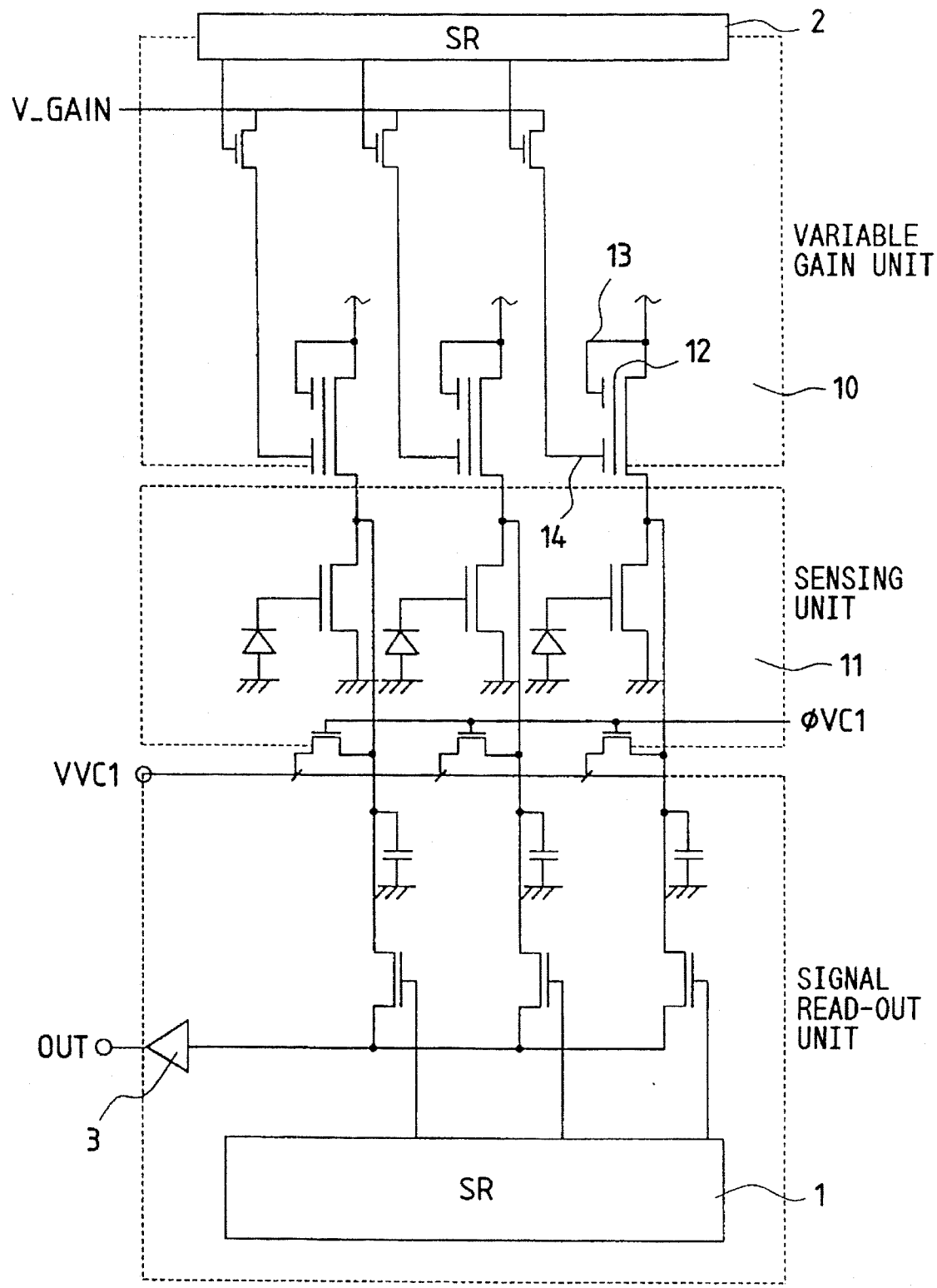
FIG. 7 shows a circuit configuration of a photo-electric conversion apparatus in accordance with an embodiment 4 of the present invention.

FIG. 7 shows a fourth embodiment of the present invention. In the first to third embodiments, the photo-electric conversion apparatus use the amplifier elements by the bipolar transistors having the base-collector junctions used as the photo-diodes. In the present embodiment, MOS's are used. The like elements to those of the previous embodiments are designated by the like numerals and the explanation thereof is omitted. In a sense amplifier 11, a photo-diode is connected to a gate of an MOS, and in a variable gain amplifier 10, a resistor of an MOS amplifier is a variable resistor which comprises a double structure of MOS gate switch a lower gate 12 being floating and one of upper gates 13 being connected to a power supply, and a voltage pulse is applied to the other upper gate 14.

The potential of the floating gate changes with an amplitude of the voltage pulse so that the MOS's of the amplifier 10 function as variable resistors. In the present embodiment, the photo signal generated by the photo-diode is converted by the factor of gain of the amplifier determined by the variable resistor, and the modulated signal is sequentially read to a shift register through a read capacitor.

While FIG. 7 shows the one-dimensional sensor, it should be understood that the present invention is not limited to the one-dimensional sensor but it may be applied to a two-dimensional sensor.

Figure 8:
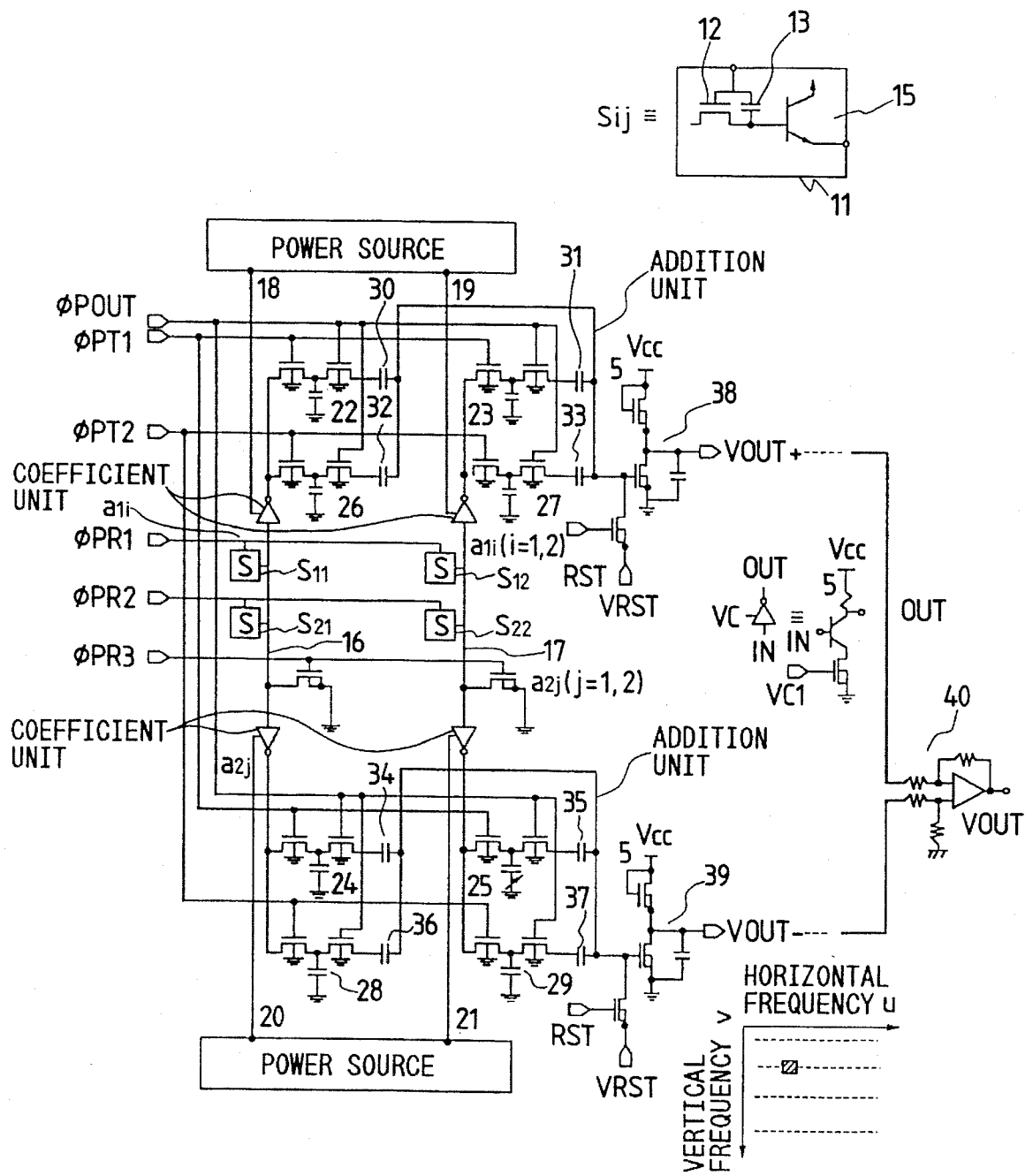
FIG. 8 shows a circuit configuration of a photo-electric conversion apparatus in accordance with an embodiment 5 of the present invention.

A fifth embodiment of the present invention is shown in FIG. 8. $S_{ij}$ (ij=1–4) comprises a base isolation PMOS 12, a base potential control capacitor 13 and a bipolar transistor 15.

Cells $S_{11}$ and $S_{21}$ output to a vertical line 16, and cells $S_{12}$ and $S_{22}$ output to a vertical line 17. Line selection is conducted by pulses $\phi_{PR1}$ and $\phi_{PR2}$.

First, a high pulse is applied to $\phi_{PR1}$ so that the cells $S_{11}$ and $S_{12}$ are selected, and the respective outputs are simultaneously read to the gates of the amplifiers $a_{ij}$ (i,j=1,2).

The gains of the amplifiers are adjusted by the vertically arranged power supplies through wires 18, 19, 20 and 21, and the pulse $\phi_{PT1}$ is rendered to the high level to read the photo output of the $S_{11}$ multiplied by the gain of the amplifier $a_{11}$ to the capacitor 22, the photo output of the $S_{12}$ multiplied by the gain of the amplifier $a_{12}$ to the capacitor 23, the photo output of the $S_{11}$ multiplied by the gain of the amplifier $a_{21}$ to the capacitor 24, and the photo output of the $S_{21}$ multiplied by the gain of the amplifier $a_{22}$ to the capacitor 25.

The pulse $\phi_{PR1}$ is then rendered to the down level and the pulse $\phi_{PR2}$ is rendered to the high level so that the cells $S_{21}$ and $S_{22}$ are selected and they are read to the gates of the amplifiers $a_{ij}$ (ij=1–2').

The pulse $\phi_{PT2}$ is rendered to the high level to read the photo output of the cell $S_{11}$ multiplied by the gain of the amplifier $a_{11}$ to the capacitor 26, the photo output of the cell $S_{12}$ multiplied by the gain of the amplifier $a_{12}$ to the capacitor 27, the photo output of the cell $S_{21}$ multiplied by the gain of the amplifier $a_{21}$ to the capacitor 28, and the photo output of the cell $S_{22}$ multiplied by the gain of the amplifier $a_{22}$ to the capacitor 29.

The signals read to the capacitors 22, 23, 26 and 27 are summed through the capacitors 30, 31, 32 and 33 and outputted from the amplifier 38, and the signals read to the capacitors 24, 25, 28 and 29 are summed through the capacitors 34, 35, 36 and 37 and outputted from the amplifier 39.

The outputs of the amplifiers 38 and 39 are differentiated by a differential amplifier 40. Accordingly, the gains may include positive gains and negative gains so that Fourier transform output of the image can be read at a high speed.

According to the present invention, the following technological advantages (1)–(4) can be attained since the sensor can output therefrom a signal on which various image processings, for example, convolution, edge output, Laplace transform, Fourier transform and wavelet transform, have been performed.

(1) A photo-electric conversion apparatus can be form on one chip, so that the cost of production can be reduced.

(2) High-speed processing can be attained since an parallel operation processing can be done on not serial output of the sensor but image data itself.

(3) A plurality of processings can be attained by one chip.

(4) Image recognition and image discrimination can be attained functionally.

What is claimed is:

1. A photo-electric conversion apparatus comprising:

a) a plurality of photo-electric conversion elements;

b) a plurality of read channels for separately reading outputs of said photo-electric conversion elements;

c) a plurality of gain controllable amplifiers provided one for each channel, and d) control signal generating means for generating signals for changing gains of said amplifiers in response to a predetermined instruction signal.

2. A photo-electric conversion apparatus according to claim 1 further comprising storage means for storing output signals of the photo-electric conversion elements through the amplifiers.

3. A photo-electric conversion apparatus according to claim 2 wherein said storage means includes capacitors.

4. A photo-electric conversion apparatus according to claim 2 further comprising read means for serially reading the signals of said storage means.

5. A photo-electric conversion apparatus according to claim 4 wherein said read means is controlled by said control means.

6. A photo-electric conversion apparatus according to claim 1, wherein each of said gain controllable amplifiers includes a transistor having a plurality of floating gate electrodes.

7. A photo-electric conversion apparatus according to claim 1, further comprising operating means for operating a plurality of output signals gain-controlled by said gain controllable amplifier.

8. A photo-electric conversion apparatus comprising:
   a) a plurality of photo-electric conversion elements each having a transistor;
   b) a plurality of read channels for reading outputs of said photo-electric conversion elements;
   c) a plurality of gain controllable amplifiers provided one for each channel;
   d) control means for controlling gains of said amplifiers in response to a predetermined instruction signal; and
   e) operating means for performing a predetermined operation on outputs read out through said read channels to execute a predetermined calculation.

9. A photo-electric conversion apparatus according to claim 8, wherein the transistor comprises a bipolar transistor.

10. A photo-electric conversion apparatus according to claim 8, wherein the transistor comprises a MOS transistor.

11. A photo-electric conversion apparatus according to claim 8, wherein said operating means includes a capacitor.

12. A photo-electric conversion apparatus according to claim 11, wherein said operating means includes a subtractor.

13. A photo-electric conversion apparatus comprising:
   a) a plurality of photo-electric conversion elements arranged in rows and columns;
   b) a plurality of read channels for reading outputs of said photo-electric conversion elements;
   c) a plurality of gain controllable amplifiers provided one for each channel;
   d) control means for controlling gains of said amplifiers in response to a predetermined instruction signal; and
   e) operating means for performing a predetermined operation on outputs read out through said read channels to execute a predetermined calculation.

14. A photo-electric conversion apparatus according to claim 13, wherein each of said photo-electric conversion elements includes a transistor.

15. A photo-electric conversion apparatus according to claim 14, wherein the transistor comprises a bipolar transistor.

16. A photo-electric conversion apparatus according to claim 14, wherein the transistor comprises a MOS transistor.

17. A photo-electric conversion apparatus according to claim 13, wherein said operating means includes a capacitor.

18. A photo-electric conversion apparatus according to claim 17, wherein said operating means includes a subtractor.

19. A photo-electric conversion apparatus comprising:
   a) a predetermined number of photo-electric conversion elements in a row direction;
   b) a predetermined number of read channels for reading outputs of said photo-electric conversion elements;
   c) a plurality of gain controllable amplifiers provided for each read channel; and
   d) control means for controlling gains of said amplifiers in response to a predetermined instruction signal.

20. A photo-electric conversion apparatus according to claim 19, wherein said photo-electric conversion elements each include a transistor.

21. A photo-electric conversion apparatus according to claim 20, wherein the transistor comprises a bipolar transistor.

22. A photo-electric conversion apparatus according to claim 20, wherein the transistor comprises a transistor.

23. A photo-electric conversion apparatus according to claim 19 further comprising operating means for performing a predetermined operation on outputs read out through said read channels to execute a predetermined calculation.

24. A photo-electric conversion apparatus according to claim 23, wherein said operating means includes a capacitor.

25. A photo-electric conversion apparatus according to claim 24, wherein said operating means includes a subtractor.

26. A photo-electric conversion apparatus according to claim 19, wherein said photo-electric conversion elements are also arranged in a column direction.

27. A photo-electric conversion apparatus according to claim 8, wherein said control means generates a control signal for controlling gains of said amplifiers.

28. A photo-electric conversion apparatus according to claim 13, wherein said control means generates a control signal for controlling gains of said amplifiers.

29. A photo-electric conversion apparatus according to claim 19, wherein said control means generates a control signal for controlling gains of said amplifiers.

* * * * *

UNITED STATES PATENT AND TRADEMARK OFFICE
CERTIFICATE OF CORRECTION

PATENT NO. : 5,539,196
DATED : July 23, 1996
INVENTOR(S) : MAMORU MIYAWAKI ET AL.

It is certified that error appears in the above-identified patent and that said Letters Patent is hereby corrected as shown below:

COLUMN 3

Line 26, "to" should read --to the--.

COLUMN 4

Line 48, "form" should read --formed--.
   Line 63, "channel," should read --channel;--.

COLUMN 5

Line 2, "claim 1" should read --claim 1,--.
   Line 6, "claim 2" should read --claim 2,--.
   Line 8, "claim 2" should read --claim 2,--.
   Line 11, "claim 4" should read --claim 4,--.
   Line 20, "amplifier." should read --amplifiers.--.
   Line 42, "tor." should read --ter.--.

UNITED STATES PATENT AND TRADEMARK OFFICE
CERTIFICATE OF CORRECTION

PATENT NO. : 5,539,196

DATED : July 23, 1996

INVENTOR(S) : MAMORU MIYAWAKI ET AL.

It is certified that error appears in the above-identified patent and that said Letters Patent is hereby corrected as shown below:

<u>COLUMN 6</u>

```
Line 13, "tor." should read --ter.--.
Line 32, "a" should read --a MOS--.
Line 34, "claim 19" should read --claim 19,--.
Line 41, "tor." should read --ter.--.
```

Signed and Sealed this

Third Day of December, 1996

Attest:

BRUCE LEHMAN

Attesting Officer     Commissioner of Patents and Trademarks